United States Patent
Scott et al.

(10) Patent No.: US 9,645,226 B2
(45) Date of Patent: May 9, 2017

(54) RADAR SYSTEM AND METHODS

(71) Applicant: Navico Holding AS, Egersund (NO)

(72) Inventors: John Scott, Auckland (NZ); Paul Robert Bailey, Auckland (NZ); Donald R. Korte, Jr., Belleair Beach, FL (US)

(73) Assignee: NAVICO HOLDING AS, Egersund (NO)

( * ) Notice: Subject to any disclaimer, the term of this patent is extended or adjusted under 35 U.S.C. 154(b) by 378 days.

(21) Appl. No.: 14/231,436

(22) Filed: Mar. 31, 2014

(65) Prior Publication Data
US 2015/0153442 A1   Jun. 4, 2015

Related U.S. Application Data

(60) Provisional application No. 61/910,734, filed on Dec. 2, 2013.

(51) Int. Cl.
*G01S 7/02* (2006.01)
*G01S 13/93* (2006.01)
(Continued)

(52) U.S. Cl.
CPC ............... *G01S 7/02* (2013.01); *B63B 45/00* (2013.01); *B63B 45/02* (2013.01); *B63B 49/00* (2013.01); *G01S 7/003* (2013.01); *G01S 7/04* (2013.01); *G01S 13/9307* (2013.01); *H01Q 1/06* (2013.01); *H01Q 1/34* (2013.01); *G01S 2007/027* (2013.01)

(58) Field of Classification Search
CPC ... B63B 45/00; B63B 2045/005; B63B 45/02; B63B 49/00; G01S 7/003; G01S 7/02; G01S 7/04; G01S 2007/027; G01S 13/02; G01S 13/04; G01S 13/06; G01S 13/86; G01S 13/88; G01S 13/93; G01S 13/9307; H01Q 1/06; H01Q 1/27; H01Q 1/34; F41A 23/20; F41G 7/007; B60Q 1/0017; B60Q 1/0023; B60Q 1/02; B60Q 1/04;
(Continued)

(56) References Cited

U.S. PATENT DOCUMENTS 3,362,289 A * 1/1968 Guin ....................... F41A 23/20
                                                      244/1 R
3,754,249 A * 8/1973 Kearney, II ............. F41G 7/007
                                                     244/3.13
(Continued)

FOREIGN PATENT DOCUMENTS

| EP | 1684376 A1 | 7/2006 |
| KR | 101258956 B1 | 4/2013 |
| WO | 2011/002316 | 1/2011 |

OTHER PUBLICATIONS

PCT International Search Report and Written Opinion; PCT/IB2014/066371; Mar. 30, 2015.

*Primary Examiner* — Bernarr Gregory
(74) *Attorney, Agent, or Firm* — Nelson Mullins Riley & Scarborough LLP

(57) ABSTRACT

A radar system. The radar system may include a housing having a base for mounting on a marine vessel. The radar system may include a radar disposed inside the housing. The radar system may include an antenna coupled to the radar. The radar system may also include a lighting system having a light source, and where a portion of the lighting system is disposed inside the housing. The radar system may include a controller coupled to the lighting system.

21 Claims, 14 Drawing Sheets

(51) Int. Cl.
  *B63B 45/00* (2006.01)
  *B63B 49/00* (2006.01)
  *H01Q 1/06* (2006.01)
  *H01Q 1/34* (2006.01)
  *B63B 45/02* (2006.01)
  *G01S 7/00* (2006.01)
  *G01S 7/04* (2006.01)
  *G01S 13/00* (2006.01)
  *H01Q 1/00* (2006.01)

(58) Field of Classification Search
  CPC ...... B60Q 1/14; B60Q 1/1415; B60Q 1/1423; B60Q 1/143
  See application file for complete search history.

(56) References Cited

U.S. PATENT DOCUMENTS

| | | | | |
|---|---|---|---|---|
| 5,313,213 A | * | 5/1994 | Neumann | B60Q 1/0023 342/165 |
| 5,430,450 A | * | 7/1995 | Holmes | B60Q 1/143 342/69 |
| 5,963,172 A | * | 10/1999 | Pfizenmaier | B60Q 1/0023 343/712 |
| 6,572,248 B2 | * | 6/2003 | Okuchi | B60Q 1/1423 362/464 |
| 7,264,384 B1 | | 9/2007 | Ryan et al. | |
| 7,439,902 B2 | * | 10/2008 | Robertson | G01S 13/04 342/147 |
| 7,672,760 B2 | * | 3/2010 | Solberg | B63B 45/02 307/157 |
| 7,677,772 B1 | * | 3/2010 | Wolske | B63B 45/00 362/297 |
| 7,741,782 B2 | * | 6/2010 | Vermeulen | H01Q 1/06 315/156 |
| 8,232,909 B2 | * | 7/2012 | Kroeger | G01S 13/86 340/500 |
| 2006/0187113 A1 | | 8/2006 | Korte | |
| 2008/0150791 A1 | | 6/2008 | Robertson et al. | |
| 2012/0280854 A1 | | 11/2012 | Corbett et al. | |
| 2012/0293361 A1 | | 11/2012 | Mowbray et al. | |

\* cited by examiner

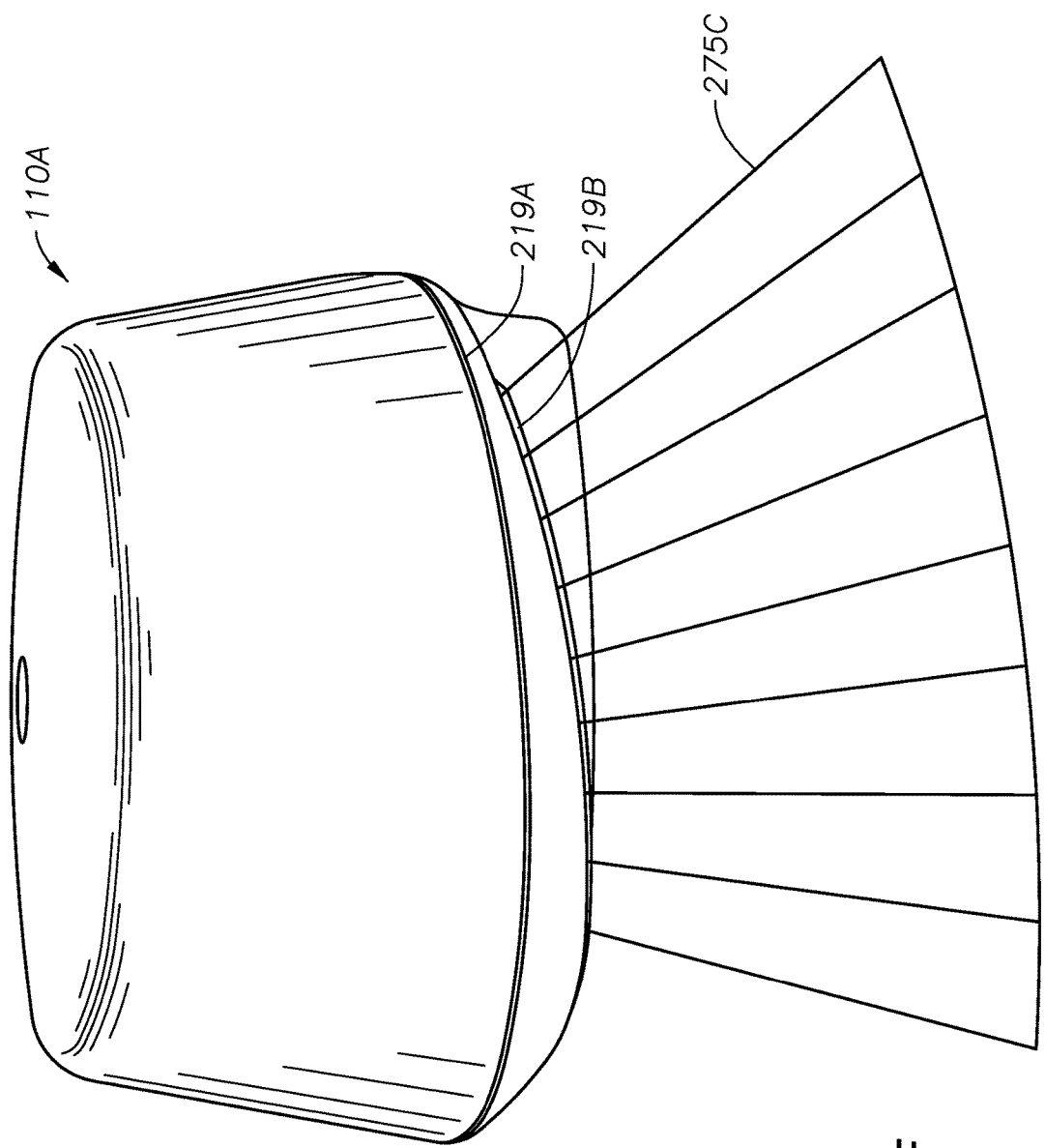

RADAR SYSTEM AND METHODS

CROSS-REFERENCE TO RELATED APPLICATIONS

This application claims benefit of U.S. provisional patent application Ser. No. 61/910,734, entitled CONTROLLABLE RADAR LIGHTING, and filed Dec. 2, 2013, which is herein incorporated by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

A radar may provide marine vessels with the capability to safely navigate a course through unknown bodies of water. As such, a radar may prove to be a useful tool in navigation by identifying neighboring vessels and obstacles in close proximity to a marine vessel.

SUMMARY

Described herein are implementations of various technologies for a radar system. The radar system may include a housing having a base for mounting on a marine vessel. The radar system may include a radar disposed inside the housing. The radar system may include an antenna coupled to the radar. The radar system may also include a lighting system having a light source, and where a portion of the lighting system is disposed inside the housing. The radar system may include a controller coupled to the lighting system.

In one implementation, the light source may include a light emitting diode mounted to a circuit board. In another implementation, the lighting system may include a light pipe that distributes light generated by the light source at predetermined beam angles with respect to the radar system. In another implementation, the lighting system may include an optical filter coupled to the light source. The optical filter may produce separate light beams emanating from the radar system. In another implementation, the housing may include an aperture through which light from the first light source is emitted. In another implementation, the lighting system may include an optical filter that may produce light emitted from an aperture at a predetermined intensity. In another implementation, the lighting system may direct a light beam at a downward angle in respect to a horizontal axis substantially parallel to the waterline of the marine vessel. In another implementation, the radar system may include a communication interface to communicate with a marine electronics device. In another implementation, the controller may include a processor and a memory. The memory may include program instructions for receiving lighting control commands and adjust the intensity of light emanating from the light source in response to receiving the lighting control commands. In another implementation, the radar system may include a power supply that powers the radar and the light source. In another implementation, the lighting system may include two light sources, where one light source emits light that signifies the port side of a marine vessel and the other light source emits light that signifies the starboard side of the marine vessel.

Described herein are implementations of various technologies for a method. In one implementation, a non-transitory computer-readable medium having stored thereon computer-executable instructions which, when executed by a computer, cause the computer to perform various actions. The actions may include receiving lighting control commands from a marine electronics device. The lighting control commands may change settings of a lighting system disposed in a radar system. The actions may include adjusting the lighting system to correspond to the lighting control commands.

In another implementation, the settings may include a predetermined beam angle of light emitted by the lighting system, a number of light beams emitted by the lighting system, an intensity level of light emitted by the lighting system, a specific color of light emitted by the lighting system or a combination thereof. In another implementation, the actions may include adjusting an amount of electric power going to one light source in the lighting system. In another implementation, the lighting control commands may include a command to turn off one light source in the lighting system. In another implementation, the lighting control commands may include one command to adjust the intensity of light emanating from an aperture in the lighting system.

Described herein are implementations of various technologies for a method. In one implementation, a non-transitory computer-readable medium having stored thereon computer-executable instructions which, when executed by a computer, cause the computer to perform various actions. The actions may include receiving an input that corresponds to settings of a lighting system. A portion of the lighting system may be disposed in a radar system. The actions may include sending commands to the radar system. The commands may adjust the lighting system based on the received input.

In another implementation, the commands may cause the radar system to stop electric power to one light source in the lighting system. In another implementation, the commands may cause the radar system to send power to one light source in the lighting system. In another implementation, the actions may include displaying the settings of the lighting system.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

FIG. 2F illustrates a perspective view of a radar system in accordance with implementations of various techniques described herein.

DETAILED DESCRIPTION

Figure 1:
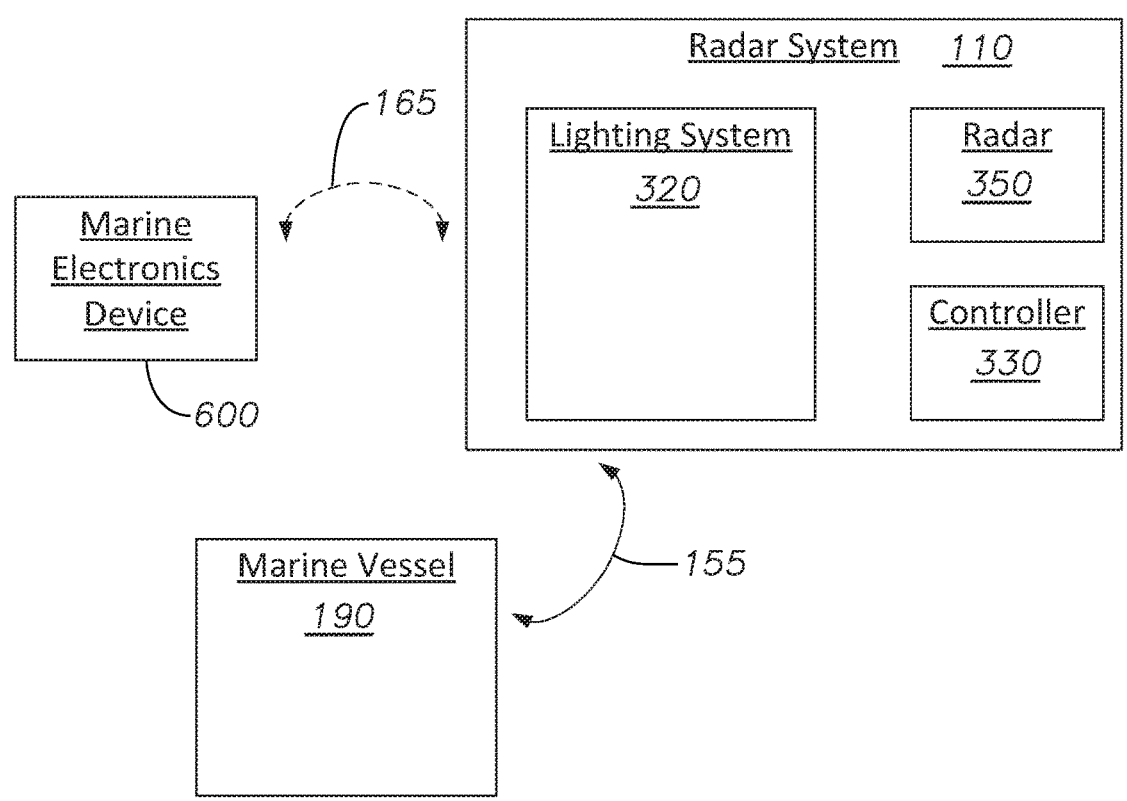
FIG. 1 illustrates a block diagram of a radar system in communication with a marine electronics device in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

Various implementations of a radar system described herein will now be described in more detail with reference to FIGS. 1-7.

FIG. 1 illustrates a block diagram of a radar system 110 in communication with a marine electronics device 600 in accordance with implementations of various techniques described herein. The radar system 110 may include a lighting system 320, a controller 330 (also called a "processor box") and a radar 350. The marine electronics device 600 may communicate with the radar system 110 over a wireless or wired network connection 165. The controller 330 may include a processor and memory, and may receive commands from the marine electronics device 600 for operating the lighting system 320. In regard to the connection 165, an Ethernet cable may be used between the marine electronics device 600 and the radar system 110, while commands for the lighting system 320 may have one or more dedicated pins on the Ethernet cable. For more information on controlling the lighting system 120 with the marine electronics device 600, see FIGS. 4 and 5 below. For more information regarding the marine electronics device 600, see the section titled MARINE ELECTRONICS DEVICE below.

The radar system 110 may be used in navigation, and positioned or mounted on top of the marine vessel 190. The radar system 110 may detect and track targets using radar signals with the onboard radar 350, while assisting the marine vessel 190 in avoiding obstacles or making a course for a specific target. The radar system 110 may be connected to the marine vessel 190 over connection 155. The connection 155 may include cables for supplying power from the marine vessel 190 to the radar system 110, as well as cables for transmitting data from instruments on the marine vessel 190 to the radar system 110. For more information regarding the radar system 110, see FIG. 3A below.

Keeping with FIG. 1, the lighting system 320 may include one or more light sources disposed in the radar system 110. The lighting system 320 may be configured to direct light beams toward the deck or other specific areas of the marine vessel 190, substantially sideways (i.e., horizontally) away from the marine vessel 190, such as for long-range visibility or navigational lighting, or at predetermined beam angles with respect to the radar system 110 or the marine vessel 190. The lighting system 320 may also be configured to illuminate specific portions of the marine vessel 190, such as a roof or walkway. For more information regarding the lighting system 320, see FIGS. 2A and 3A below.

Figure 2A:
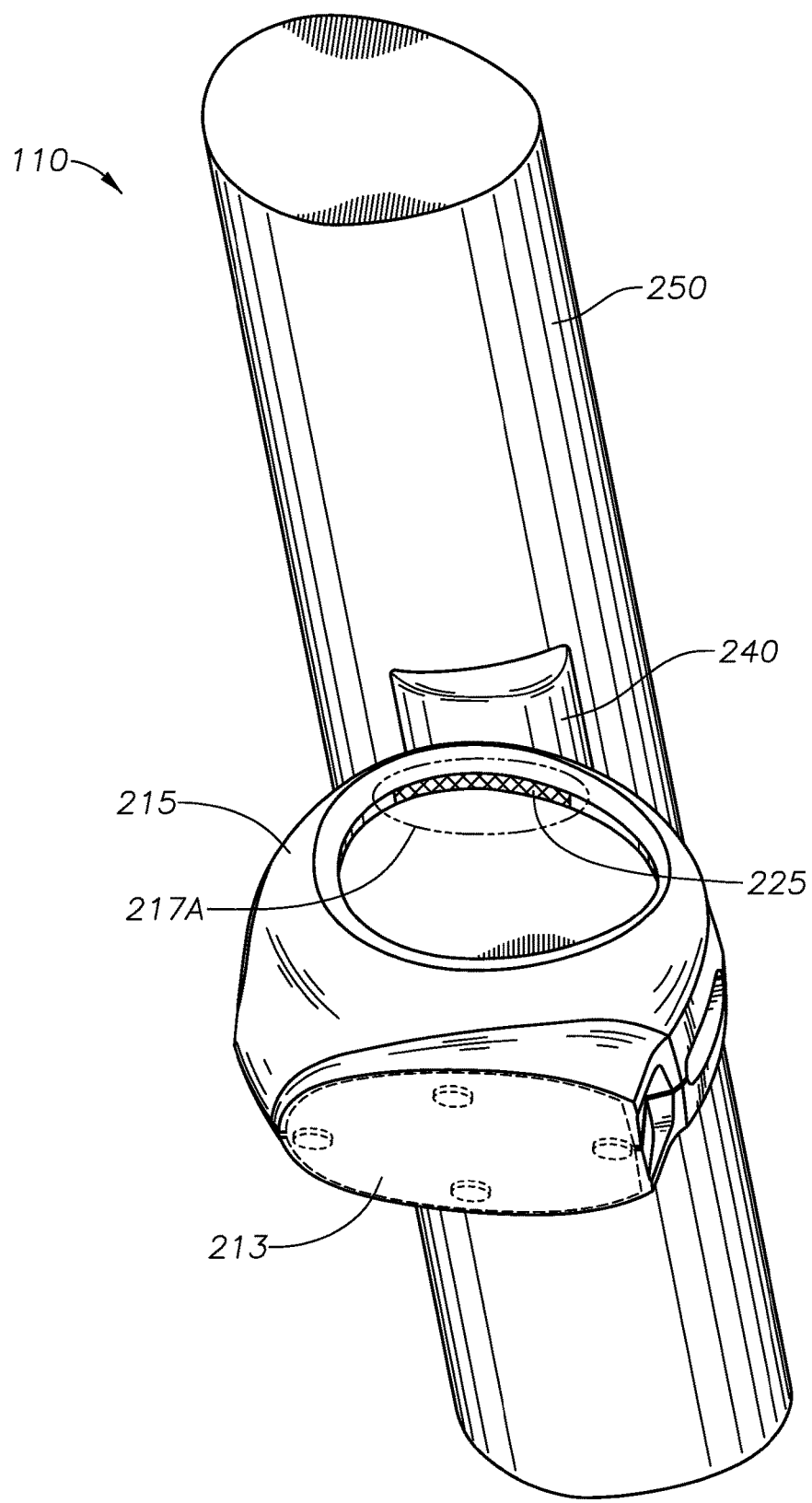
FIG. 2A illustrates a bottom perspective view of a radar system in accordance with implementations of various techniques described herein.
Figure 2C:
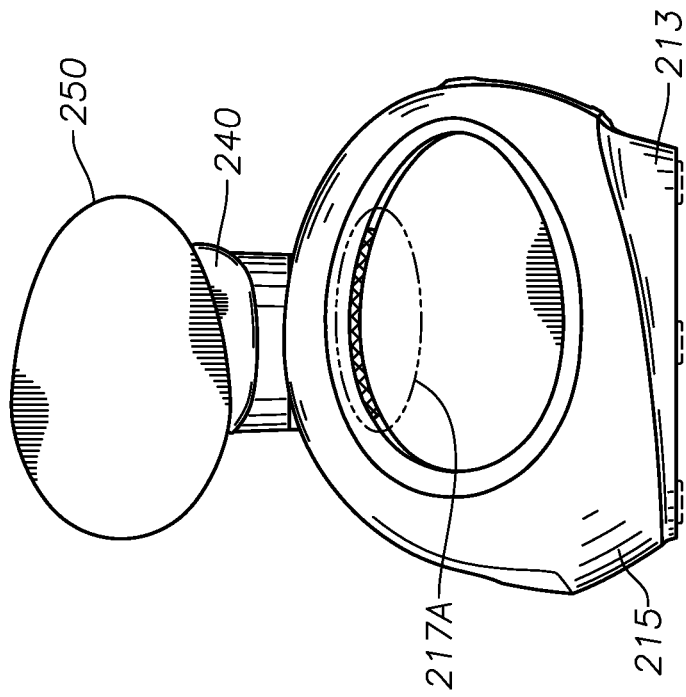
FIGS. 2B-2C illustrates side views of a radar system in accordance with implementations of various techniques described herein.
Figure 2B:
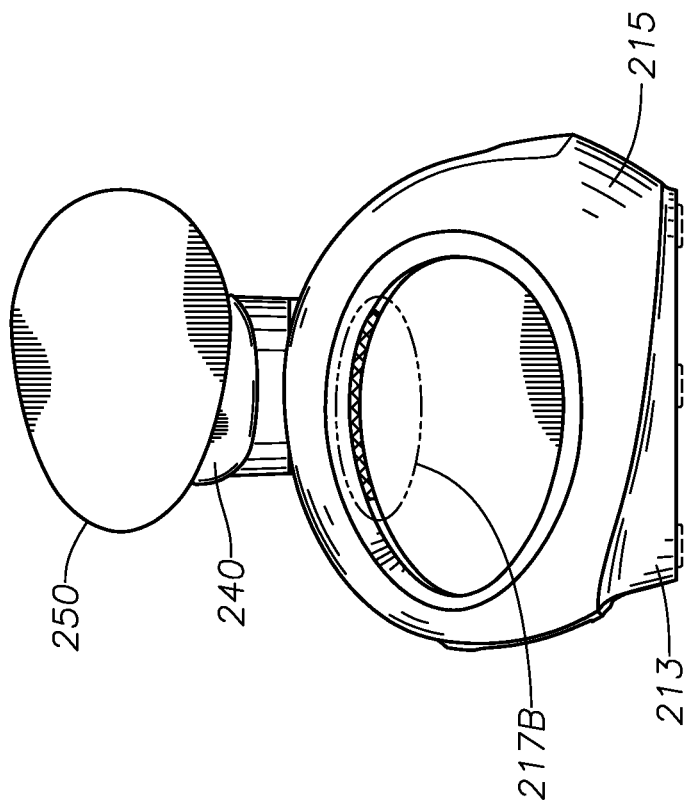

FIG. 2A illustrates a bottom perspective view of the radar system 110 in accordance with implementations of various techniques described herein. The radar system 110 may include a housing 215 coupled to a pedestal 240. The pedestal 240 may be coupled to an antenna 250. The antenna 250 may be coupled to a radar disposed inside the housing 215. The housing 215 may be one or more contiguous sections (also called "endcaps") configured to enclose the components of the radar system 110. The housing 215 may include a base 213 configured to be coupled to the marine vessel 190. The pedestal 240 may be configured to support or couple with the antenna 250. The antenna 250 may be part of the radar system 110 or a separate component. Further, the radar system 110 may include one or more light apertures, such as light apertures 217A and 217B, disposed in the housing 215, such that light sources (not shown) may emit light through the light apertures. See FIGS. 2B-2C for side views of the radar system 110 showing light apertures 217A and 217B. In one implementation, light may exit the light apertures 217A-217B at predetermined beam angles with respect to the marine vessel 190, the radar system 110 or the pedestal 240.

Keeping with FIG. 2A, a light pipe 225 (also called a "light tube") may be disposed inside light aperture 217A. The light pipe 225 may be an optical waveguide configured to transport or distribute light emanating from one or more light sources inside the radar system 110 through the light aperture 217A and outside the radar system 110. The light pipe 225 may be made from a translucent material, such as plastic, or another material configured to produce light beams with specific light characteristics. Specific light characteristics may include attributes such as a particular color of light, beam angles, beam shapes, beam patterns, light intensity (i.e., brightness), luminance or any other specific light characteristics. An example of the light pipe 225 may be seen in FIG. 3B. A sealing gasket (not shown) may be used with sections of the housing 215 and the light pipe 225 to prevent water or debris from entering the radar system 110.

Likewise, the light pipe 225 may be configured to produce light at one or more predetermined beam angles in relation to the radar system 110 or the marine vessel 190. For instance, a wide beam (e.g., a beam angle above 180 degrees) and a narrow beam (e.g., a beam angle less than 45 degrees) may be emanating from the light aperture 217A. Further, the light pipe 225 may be used to produce accent lighting for the marine vessel 190 or a portion of the radar system 110. In one implementation, the light pipe 225 may be configured to direct light beams at a downward angle in respect to a horizontal axis running through the radar system 110 or a horizontal axis substantially parallel to the waterline of the marine vessel 190.

Optical filters, such as Fresnel filters, may also be coupled with the light pipe 225 or a light source disposed inside the radar system 110. An optical filter may absorb, diffuse, or reflect part of a light beam. One example of an optical filter may be a thin-film coating applied to the light pipe 225. As such, the thin-film coating may be used to eliminate or remove one or more specific wavelengths of light passing through the light pipe 225. Other types of filters used in the radar system 110, may include polarizing, haze or warming filters. Optical filters may be used to configure a light aperture to produce light at a predetermined intensity or frequency, such as to produce a glowing effect.

Furthermore, optical filters may be used to remove various portions of light beams emitted by a light aperture. In one implementation, optical filters may be used to produce two or more separate light beams from a light aperture, where the light beams are separated by a predetermined beam angle.

Figure 2D:
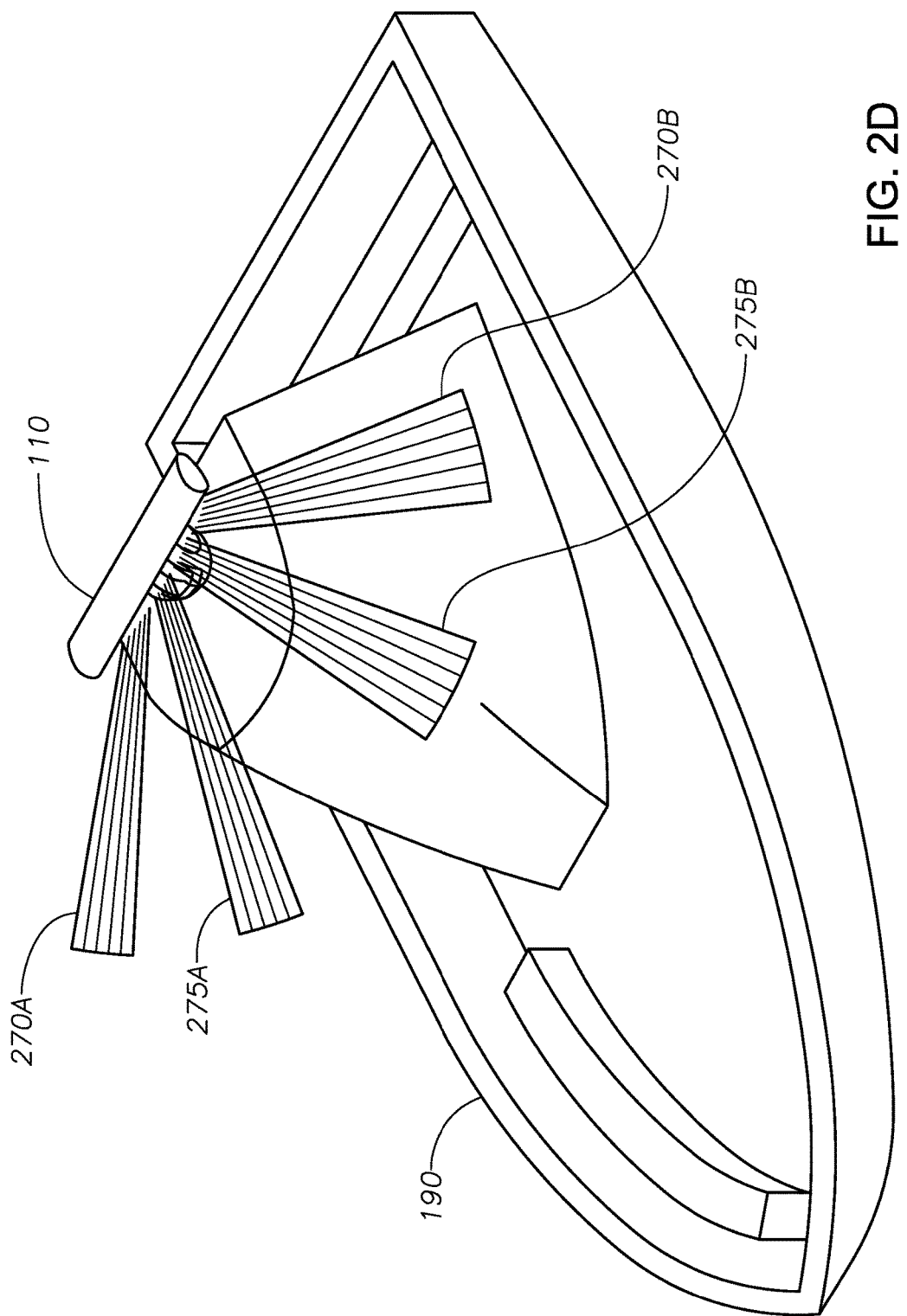
FIG. 2D illustrates a perspective view of a radar system disposed on a marine vessel in accordance with implementations of various techniques described herein.
Figure 2E:
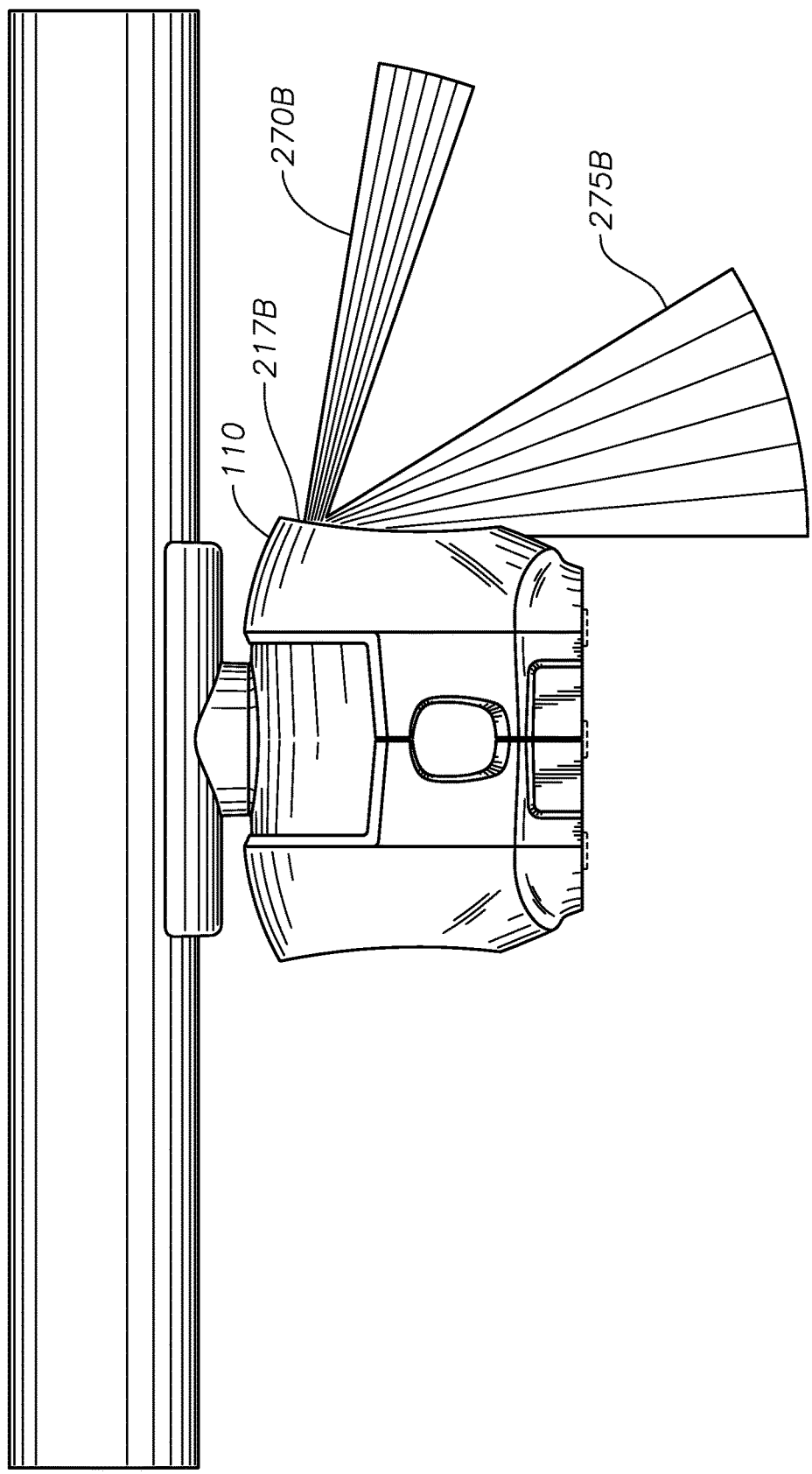
FIG. 2E illustrates a side view of a radar system in accordance with implementations of various techniques described herein.

FIG. 2D illustrates an example of the radar system 110 mounted on the marine vessel 190. As shown, light beams emanate from the light apertures 217A (not shown) and 217B. A horizontal light beam 270A and a downward light beam 275A emanate from the light aperture 217A, while a horizontal light beam 270B and a downward light beam 275B emanate from the light aperture 217B. As such, light beams 270A and 275A may be separated by a dark or dim region. This dark or dim region may be generated by configuring a light pipe or an optical filter in a particular aperture to remove a portion of a light beam regarding one or more predetermined beam angles with respect to the particular aperture. While only two separate light beams are shown for the light apertures 217A and 217B, three or more separate light beams may be emanating from a particular aperture. FIG. 2E illustrates a side view of the radar system 110 with light beams 270B and 275B emanating from the light aperture 217B.

FIG. 2F illustrates an example of a dome radar 110A in accordance with implementations of various techniques described herein. The dome radar 110A may include a light aperture 219A that illuminates a ring around the dome radar 110A. The light aperture 219A may be covered to produce an illuminated seal in the dome radar 110A. The dome radar 110A may also include a light aperture 219B that is proximate the base of the dome radar 110A. As such, a downward light beam 275C may emanate from the light aperture 219B. One or more light sources may be positioned in light apertures 219A or 219B.

Figure 3A:
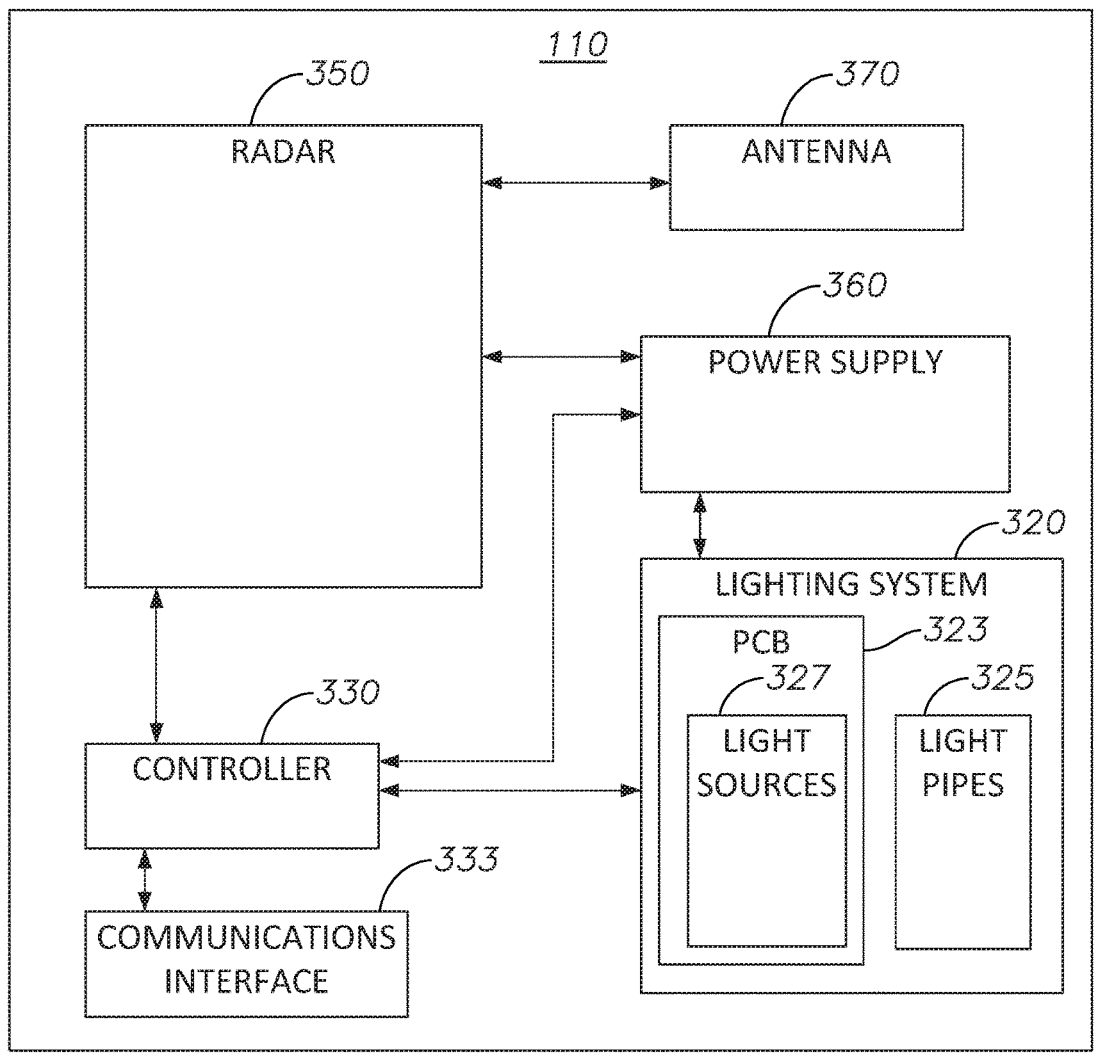
FIG. 3A illustrates a schematic view of a radar system in accordance with implementations of various techniques described herein.
Figure 3B:
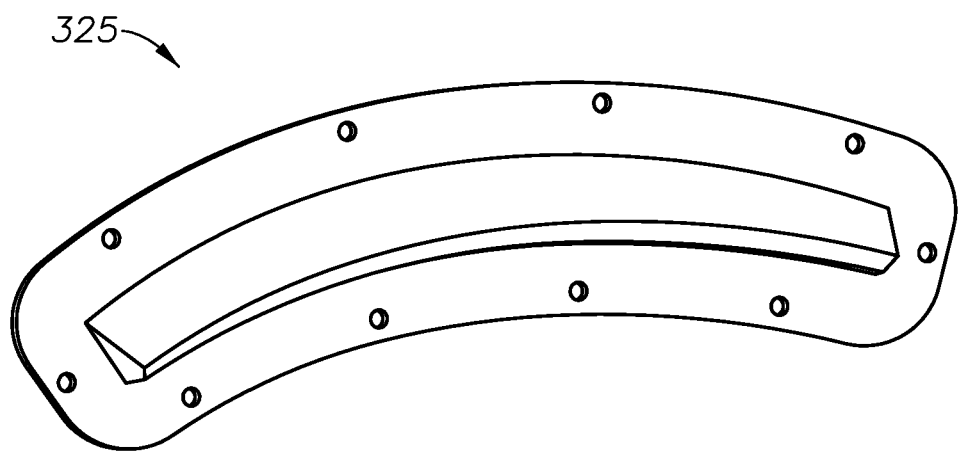
FIG. 3B illustrates a light pipe in accordance with implementations of various techniques described herein.

FIG. 3A illustrates a schematic of the radar system 110 in accordance with implementations of various techniques described herein. The radar system 110 may include a controller 330, a communications interface 333, a radar 350, a power supply 360 and an antenna 370. The communications interface 333 may be used to communicate wirelessly or over a wired connection with the marine electronics device 600 or the marine vessel 190. The controller 330 may include a processor and memory, and may be coupled to the radar 350, the power supply 360 and the lighting system 320. The power supply 360 may be used to provide electric power to various components throughout the radar system 110, such as the light sources 327 and the radar 350.

The radar 350 may include radar components, such as a signal processor, a transmitter for sending radar signals through the antenna 370, a receiver for receiving radar signals from the antenna 370, a voltage oscillator, an amplifier for radar signals received by the antenna 370, one or more filters to block frequency bands of signals received by the antenna 370, or other similar radar components for receiving, transmitting or analyzing radar signals. For more information regarding the operation of radar on a marine vessel or boat, see commonly owned U.S. patent application Ser. No. 13/380,151, filed in the United States on Dec. 22, 2011, now U.S. Pat. No. 9,442,191, with a PCT filing date of Jul. 1, 2010, that was published as U.S. Patent Application Publication Number US 2012/0280854 A1, titled SIGNAL PROCESSING SYSTEM AND METHOD, which is incorporated herein by reference. More information regarding radar operations may be found in commonly owned U.S. patent application Ser. No. 13/474,289, filed on May 17, 2012, now U.S. Pat. No. 9,213,088, that was published as U.S. Patent Application Publication Number US 2012/0293361 A1, titled RADAR CLUTTER SUPPRESSION SYSTEM, which is also incorporated herein by reference.

Figure 3C:
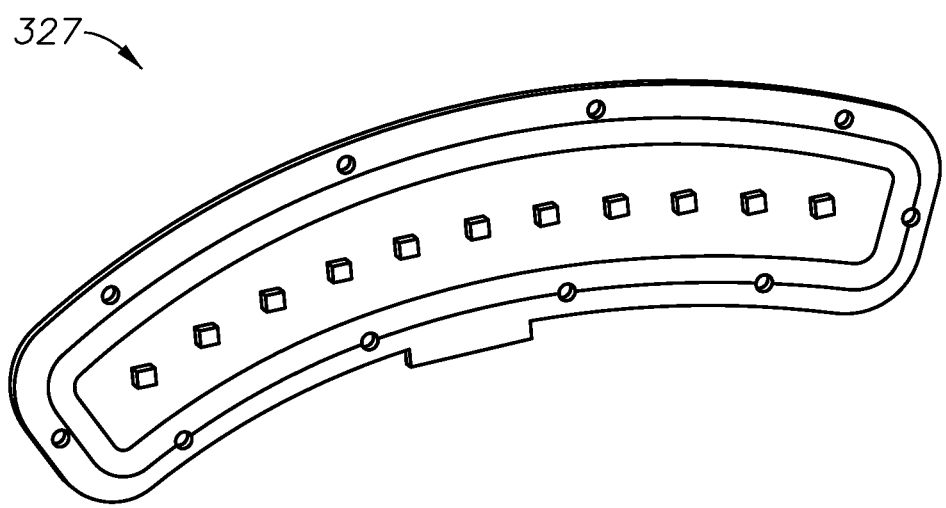
FIG. 3C illustrates a light source in accordance with implementations of various techniques described herein.
Figure 3D:
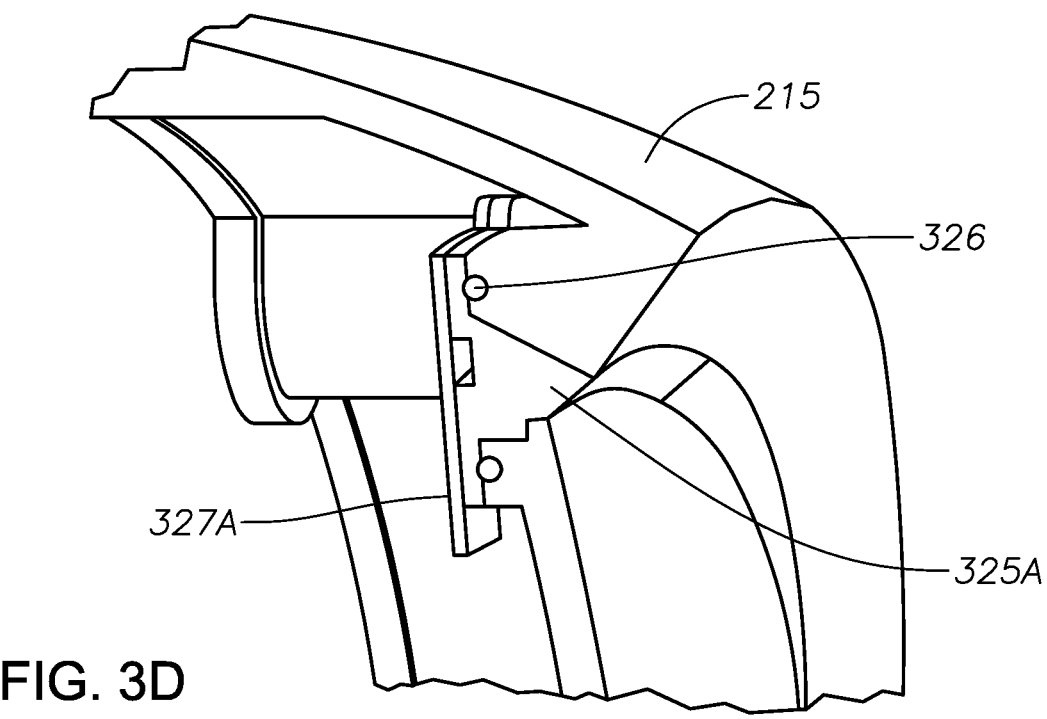
FIG. 3D illustrates a portion of a radar system in accordance with implementations of various techniques described herein.
Figure 3E:
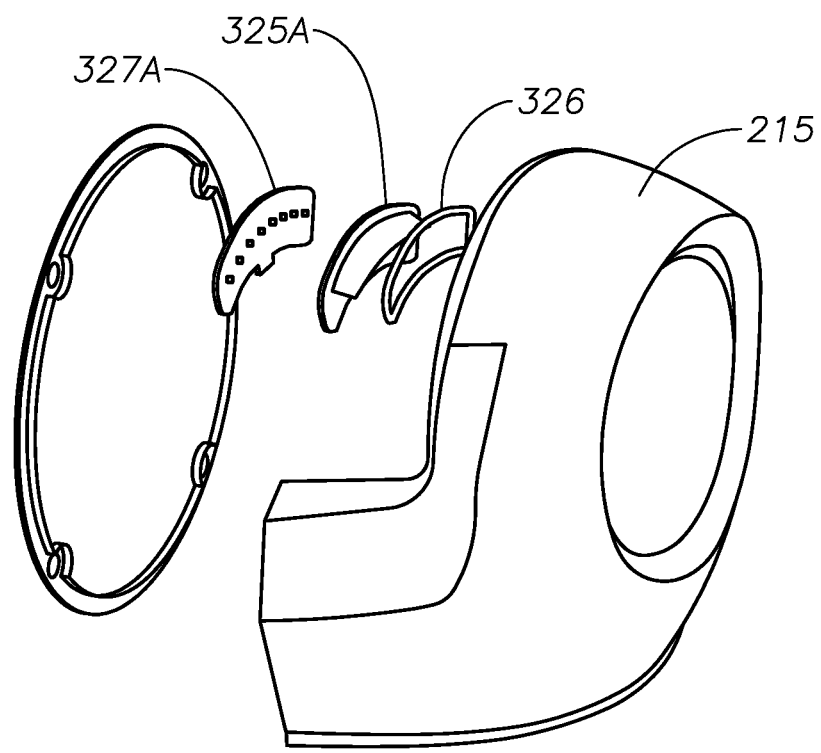
FIG. 3E illustrates an exploded view of a portion of a radar system in accordance with implementations of various techniques described herein.

Furthermore, the radar system 110 may include a lighting system 320 with a circuit board 323, one or more light sources 327 and one or more light pipes 325. In one implementation, the light sources 327 may include light emitting diodes (LEDs), such as surface mounted (SMD) LEDs, that are mounted to the circuit board 323. As such, the circuit board 323 may be a printed circuit board (PCB). An example of LEDs mounted to a PCB is shown in FIG. 3C. The LEDs may be blue, green, red, multi-color, or any other colors or color combinations. While LEDs are shown as light sources in one implementation, other implementations may include fluorescent, halogen, or any other sources of light. FIG. 3D illustrates a portion of the radar system 110 with the light pipe 325A being coupled to light source 327A along and a sealing gasket 326. FIG. 3E illustrates an exploded view of the portion of the radar system 110.

Keeping with FIG. 3A, the lighting system 320 may be configured to emit light at a predetermined luminous intensity. In one example, the light pipes 325 may be configured to smooth the intensity of the light sources 327, e.g., to generate a glowing effect instead of a hot spot. Furthermore, the controller 330 may adjust the intensity emitted by the lighting system 320 through several methods. For instance, the controller 330 may adjust the electrical current going through the circuit board 323 to generate light from the light sources 327 at a low, medium, high or other predetermined intensity levels.

In one implementation, the lighting system 320 may be configured for navigational lighting. For navigational lighting, the lighting system 320 may have one light aperture on the radar system 110 emit red light that signifies the port side of the marine vessel 190 and another light aperture on the radar system 110 emit green light that signifies the starboard side of the marine vessel 190. In another implementation, the lighting system 320 may be configured for anchor lighting, such as to emit white light at substantially 360 degrees around a masthead of the marine vessel 190.

Figure 4:
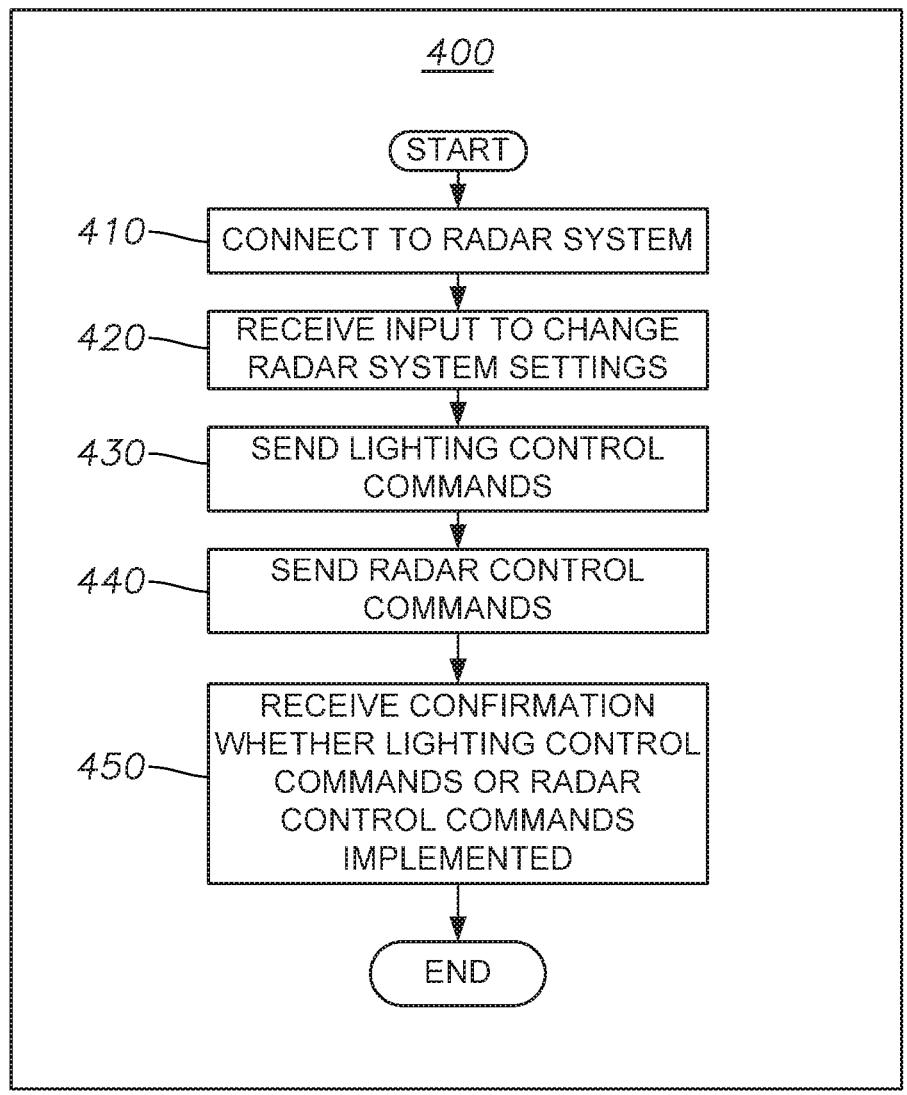
FIG. 4 is a flow diagram describing a method for a marine electronics device in accordance with implementations of various techniques described herein.

FIG. 4 illustrates a flow diagram of a method 400 for operating the radar system 110 in accordance with implementations of various techniques described herein. In one implementation, method 400 may be performed by the marine electronics device 600. It should be understood that while method 400 indicates a particular order of execution of operations, in some implementations, certain portions of the operations might be executed in a different order. Further, in some implementations, additional operations or steps may be added to the method 400. Likewise, some operations or steps may be omitted. Method 400 may be described with respect to FIGS. 1 and 3A.

At block 410, the marine electronics device 600 may connect to the radar system 110. The connection may be a network connection over a wired or wireless connection as described in FIG. 1 that enables the devices to communicate with each other. Upon initializing a connection, the marine electronics device 600 may receive one or more settings regarding the radar system 110 (i.e., "the radar system settings"). The radar system settings may pertain to the lighting system 320, such as intensity levels for the light sources 327, or operating conditions for the radar 350. The operating conditions for the radar 350 may correspond to conditions for transmitting and/or receiving radar signals from the antenna 350, such as the designated frequency band or the specified receiver gain. Furthermore, the marine electronics device 600 may display the radar system settings. For more information on displaying the radar system settings, see the section titled MARINE ELECTRONICS DEVICE below.

In one implementation, the lighting system 320 may have automatic set times for adjusting settings regarding the radar 350 or the lighting system 320 (e.g., automatically turn ON a light source at a predetermined time, such as 7:00 p.m. or turning OFF a light source at 7:00 a.m.). The automatic set times may be configured on the marine electronics device 600.

At block 420, the marine electronics device 600 may receive an input to adjust or change one or more of the radar system settings. For instance, a user may input a predetermined value into the marine electronics device 600 for a specific radar system setting. For instance, the input may designate the color of light emitted by the light sources 327, the luminous intensity of light emitted by the light sources 327, or any other specific light characteristics regarding the lighting system 320.

At block 430, in response to the input at block 420, the marine electronics device 600 may send lighting control commands to the radar system 110. The lighting control commands may be received by the controller 330 through the communications interface 333 onboard the radar system 110. The lighting control commands may be configured to adjust the lighting system 320 to correspond to the input at block 420. As such, the lighting control commands may be configured to turn ON one or more of the light sources 327, turn OFF one or more the light sources 327, change the intensity level of the lighting system 320, or modify other specific light characteristics regarding the lighting system 320.

At block 440, in response to the input at block 420, the marine electronics device 600 may send radar control commands to the radar system 110. The radar control commands may be configured to adjust the radar 350 to correspond to the input at block 420. The radar system commands may include commands to modify the operating conditions of the radar 350, such as for purposes of navigation or detecting specific targets.

At block 450, the marine electronics device 600 may receive confirmation from the radar system 110 regarding whether the radar system settings were implemented according to the input at block 420. For instance, the radar system 110 may send periodic updates to the marine electronics device 600 regarding the radar system settings, or acknowledgments that the lighting control commands or the radar control commands were received and/or implemented.

Figure 5:
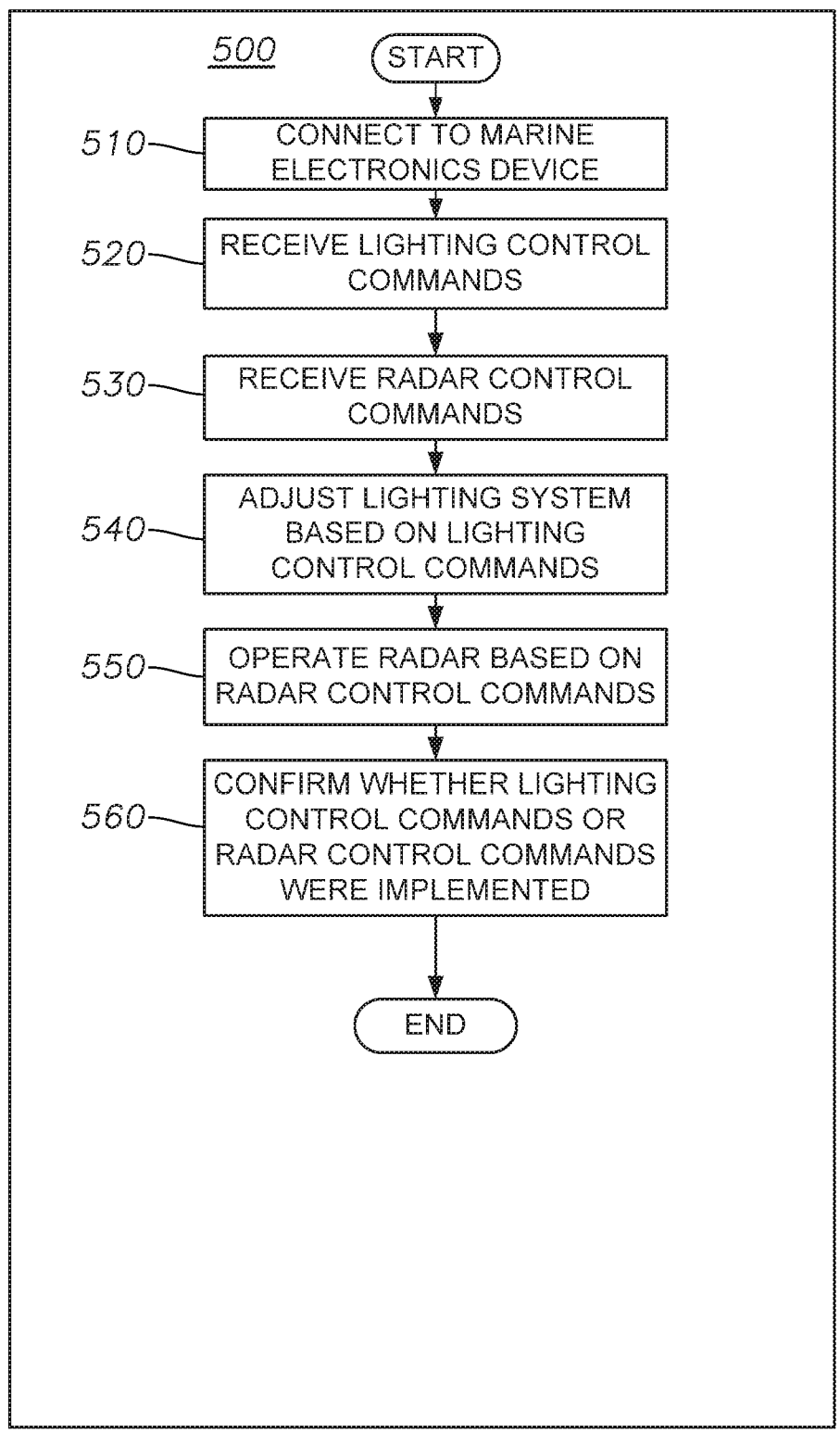
FIG. 5 is a flow diagram describing a method for a radar system in accordance with implementations of various techniques described herein.

FIG. 5 illustrates a flow diagram of a method 500 for modifying various settings of the radar system 110 in accordance with implementations of various techniques described herein. In one implementation, method 500 may be performed by the radar system 110. It should be understood that while method 500 indicates a particular order of execution of operations, in some implementations, certain portions of the operations might be executed in a different order. Further, in some implementations, additional operations or steps may be added to the method 500. Likewise, some operations or steps may be omitted. Method 500 may be described with respect to FIGS. 1 and 3A.

At block 510, the radar system 110 may connect to the marine electronics device 600. The radar system 110 may use a network connection similar to the one described at block 410. During the connection's initialization, the radar system 110 may send the current settings of the lighting system 320 or the radar 350 to the marine electronics device 600.

At block 520, the radar system 110 may receive lighting control commands from the marine electronics device 600. The lighting control commands may be similar to the ones describes at block 430.

At block 530, the radar system 110 may receive radar control commands from the marine electronics device 600. The radar control commands may be similar to the ones describes at block 440.

At block 540, the radar system 110 may configure or adjust the lighting system 120 based on the lighting control commands received at block 520. The lighting control commands may be similar to the commands described at block 430. For example, in response to receiving the lighting control commands, the controller 130 may start or stop transmitting electric power to the light sources 327 in order to turn ON or OFF the light sources 327, respectively. Further, the controller 330 may configure the luminous intensity or other settings for the lighting system 320 to correspond to the lighting control commands.

At block 550, the radar system 110 may operate the radar 350 based on the radar control commands received at block 530. The radar control commands may be similar to the commands describes at block 440. For instance, the radar system 110 may transmit or receive radar signals through the radar 350 based on the radar control commands.

At block 560, the radar system 110 may confirm with the marine electronics device 600 that the radar system settings were implemented. For instance, the radar system 110 may send an acknowledgment to the marine electronics device 600 that the lighting control commands or the radar control commands were received. The radar system 110 may send a message describing whether the lighting control commands or the radar control commands were successfully implemented in the radar system 110.

Marine Electronics Device

Figure 6A:
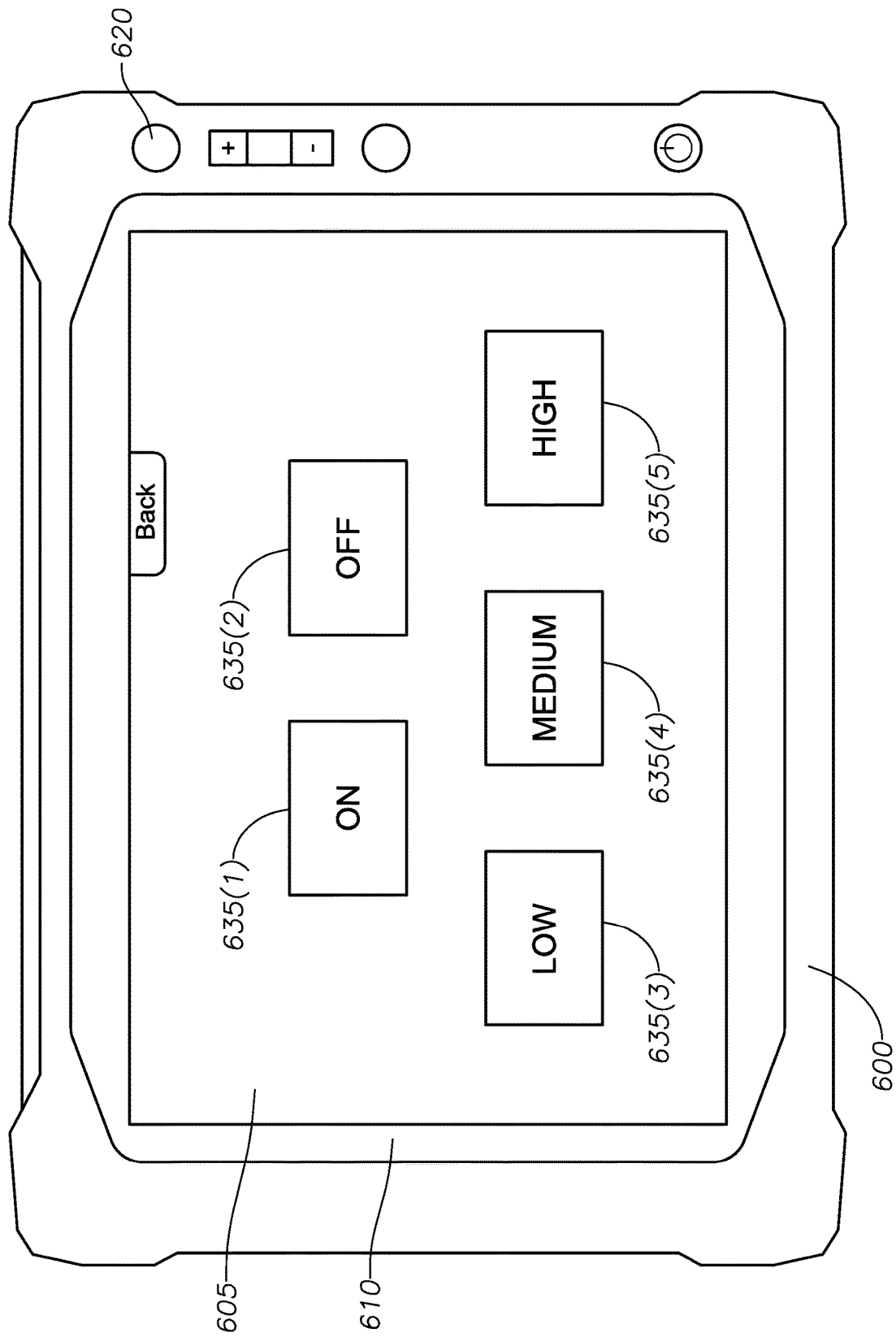
FIG. 6A illustrates a schematic of a marine electronics device in accordance with implementations of various techniques described herein.

FIG. 6A illustrates a schematic diagram of the marine electronics device 600 (also called "multi-function display") in accordance with various implementations described herein. The computing system on the marine electronics device 600 may be described in more detail with reference to FIG. 7. The marine electronics device 600 may be a display device that includes a screen 610 with a graphical user interface 605. The graphical user interface 605 may be configured to send commands to the controller 330 on the radar system 110. These commands may be similar to the ones describes above in connection with the lighting control commands or radar control commands describes in FIGS. 4 and 5. For instance, the graphical user interface 605 may control specific light characteristics from a particular light aperture (e.g., turn ON a light source for light aperture 217A or 217B, set a light source to a maximum intensity level, etc.). The graphical user interface 605 may display data regarding radar system settings such as those described at block 410 of FIG. 4. The graphical user interface 605 may provide icons 635 to control the radar system settings. For instance, the light sources 327 may be turned ON or OFF using icons 635(1) and 635(2), respectively. Light intensity levels for the lighting system 320 may be controlled by the icons for low light intensity 635(3), medium light intensity 635(4) or high light intensity 635(5).

In certain implementations, the screen 610 may be sensitive to touching by a finger. In other implementations, the screen 610 may be sensitive to the body heat from the finger, a stylus, or responsive to a mouse. The marine electronics device 600 may also include a plurality of buttons 620, which may be either physical buttons or virtual buttons, or a combination thereof.

Figure 6B:
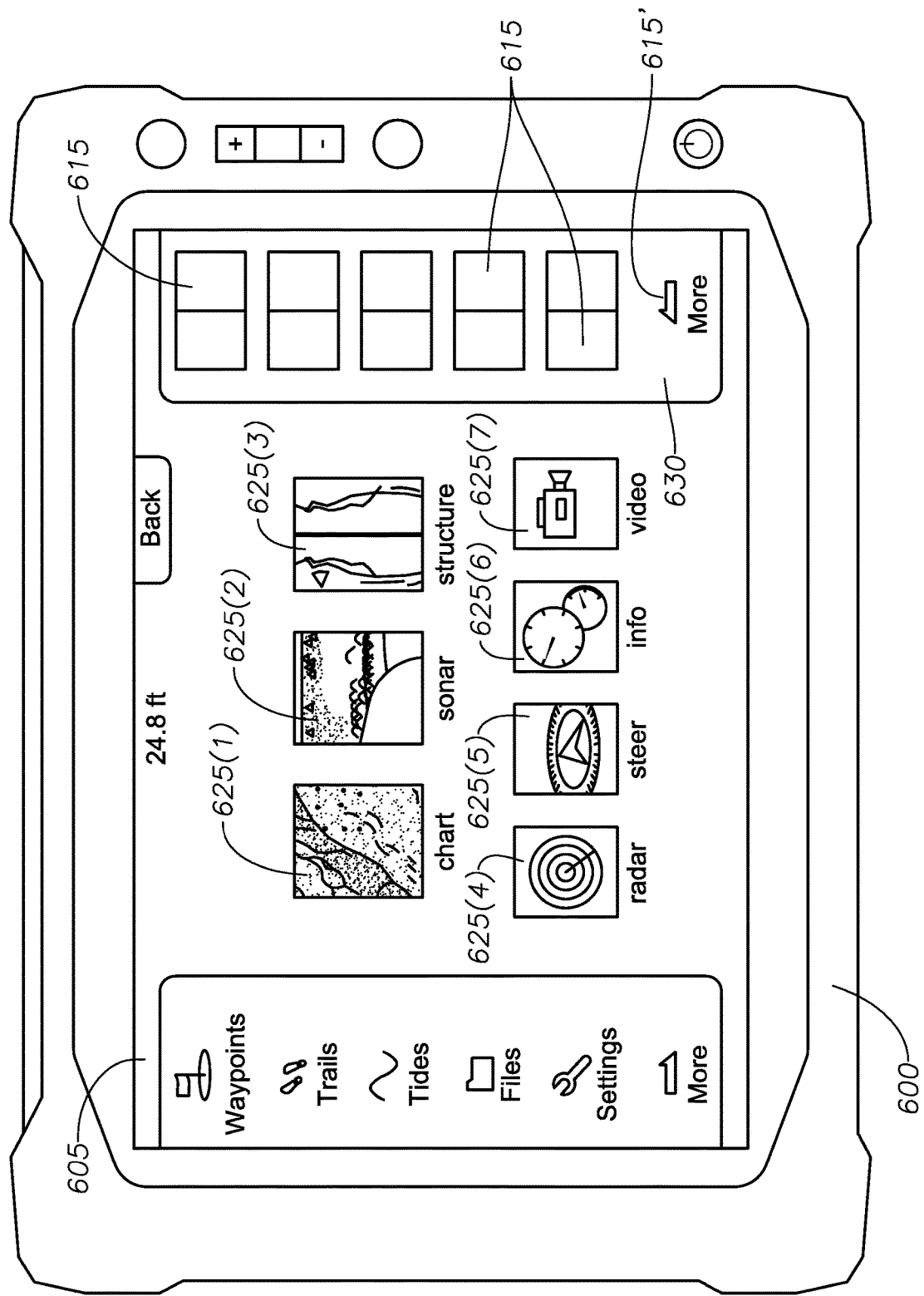
FIG. 6B illustrates a schematic of a marine electronics device in accordance with implementations of various techniques described herein.

FIG. 6B illustrates the graphical user interface 605 for the marine electronics device 600 in accordance with various implementations described herein. The graphical user interface 605 may provide a selection of marine electronics data types for display in accordance with implementations described herein. The different marine electronics data types may be presented by icons 625. The icons may include an icon for chart data type 625(1), sonar data type 625(2), structure data type 625(3), radar data type 625(4), steering data type 625(5), dashboard information type 625(6), and video 625(7).

The chart data type icon 625(1) may be configured for displaying a local map of a region surrounding the location of the marine electronics device 600. Where the marine electronics device 600 is carried over a body of water by a vessel, the sonar data type icon 625(2) may be configured for displaying sonar data from the body of water surrounding the vessel. The structure data type icon 625(3) may be configured for providing a higher resolution image covering a wider area of the body of water surrounding the vessel. The radar data type icon 625(4) may be configured for providing a radar view of the area surrounding the marine electronics device 600. The steering data type icon 625(5) may be configured for displaying information, such as distance to destination, speed over ground, and time to destination. The dashboard data type icon 625(6) may be configured for displaying an instrument panel for a vessel carrying the marine electronics device 600. The instrument panel may include measurement meters that provide information such as, for example, bearing, speed, fuel level, and oil level.

Additionally, the screen 610 may display a side tray 630 of additional options 215. Among the additional options 615 may be an option 615' for more additional options. Selection of option 615' may bring out another tray menu that includes an option for customizing the display.

Computing System

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, and the like.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, the global positioning system (GPS) and like technologies.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 7:
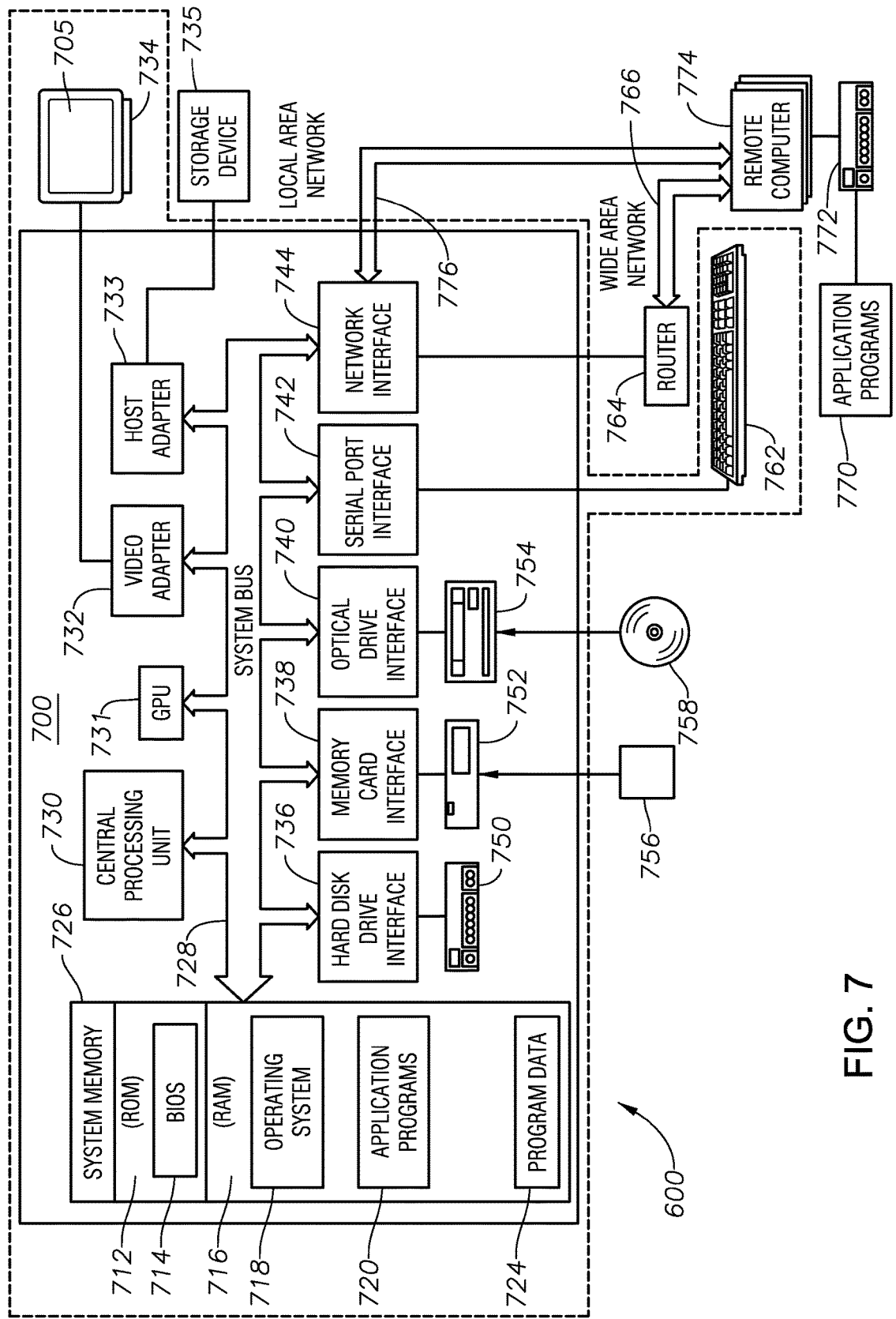
FIG. 7 illustrates a schematic diagram of a computing system in which the various technologies described herein may be incorporated and practiced.

FIG. 7 illustrates a schematic diagram of the marine electronics device 600 having a computing system 700 in accordance with implementations of various techniques described herein. The computing system 700 may be a conventional desktop, a handheld device, a controller, a personal digital assistant, a server computer, an electronic device/instrument, a laptop, a tablet, or part of a navigation system, or sonar system. It should be noted, however, that other computer system configurations may be used.

The computing system 700 may include a central processing unit (CPU) 730, a system memory 726, a graphics processing unit (GPU) 731 and a system bus 728 that couples various system components including the system memory 726 to the CPU 730. Although only one CPU 730 is illustrated in FIG. 7, it should be understood that in some implementations the computing system 700 may include more than one CPU 730.

The CPU 730 can include a microprocessor, a microcontroller, a processor, a programmable integrated circuit, or a combination thereof. The CPU 730 can comprise an off-the-shelf processor such as a Reduced Instruction Set Computer (RISC), or a Microprocessor without Interlocked Pipeline Stages (MIPS) processor, or a combination thereof. The CPU 730 may also include a proprietary processor.

The GPU 731 may be a microprocessor specifically designed to manipulate and implement computer graphics. The CPU 730 may offload work to the GPU 731. The GPU 731 may have its own graphics memory, and/or may have access to a portion of the system memory 726. As with the CPU 730, the GPU 731 may include one or more processing units, and each processing unit may include one or more cores.

The CPU 730 may provide output data to a GPU 731. The GPU 731 may generate graphical user interfaces that present the output data. The GPU 731 may also provide objects, such as menus, in the graphical user interface. A user may provide inputs by interacting with the objects. The GPU 731 may receive the inputs from interaction with the objects and provide the inputs to the CPU 730. A video adapter 732 may be provided to convert graphical data into signals for a monitor 734. The monitor 734 includes a screen 705. The screen 705 can be sensitive to heat or touching (now collectively referred to as a "touch screen"). In one implementation, the host computer 799 may not include a monitor 734.

The system bus 728 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 726 may include a read only memory (ROM) 712 and a random access memory (RAM) 716. A basic input/output system (BIOS) 714, containing the basic routines that help transfer information between elements within the computing system 700, such as during start-up, may be stored in the ROM 712.

The computing system 700 may further include a hard disk drive interface 736 for reading from and writing to a hard disk 750, a memory card reader 752 for reading from and writing to a removable memory card 756, and an optical disk drive 754 for reading from and writing to a removable optical disk 758, such as a CD ROM or other optical media. The hard disk 750, the memory card reader 752, and the optical disk drive 754 may be connected to the system bus 728 by a hard disk drive interface 736, a memory card reader interface 738, and an optical drive interface 740, respectively. The drives and their associated computer-readable media may provide nonvolatile storage of computer-readable instructions, data structures, program modules and other data for the computing system 700.

Although the computing system 700 is described herein as having a hard disk, a removable memory card 756 and a removable optical disk 758, it should be appreciated by those skilled in the art that the computing system 700 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 700. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 700 may also include a host adapter 733 that connects to a storage device 735 via a small computer system interface (SCSI) bus, a Fiber Channel bus, an eSATA bus, or using any other applicable computer bus interface. The computing system 700 can also be connected to a router 764 to establish a wide area network (WAN) 766 with one or more remote computers 774. The router 764 may be connected to the system bus 728 via a network interface 744. The remote computers 774 can also include hard disks 772 that store application programs 770.

In another implementation, the computing system 700 may also connect to one or more remote computers 774 via local area network (LAN) 776 or the WAN 766. When using a LAN networking environment, the computing system 700 may be connected to the LAN 776 through the network interface or adapter 744. The LAN 776 may be implemented via a wired connection or a wireless connection. The LAN 776 may be implemented using Wi-Fi technology, cellular technology, or any other implementation known to those skilled in the art. The network interface 744 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 774. It will be appreciated that the network connections shown are exemplary and other means of establishing a communications link between the computer systems may be used.

A number of program modules may be stored on the hard disk 750, memory card 756, optical disk 758, ROM 712 or RAM 716, including an operating system 718, one or more application programs 720, and program data 724. In certain implementations, the hard disk 750 may store a database system. The database system could include, for example, recorded points. The application programs 720 may include various mobile applications ("apps") and other applications configured to perform various methods and techniques described herein. The operating system 718 may be any suitable operating system that may control the operation of a networked personal or server computer.

A user may enter commands and information into the computing system 700 through input devices such as a keyboard 762 and pointing device. Other input devices may include a microphone, joystick, game pad, satellite dish, scanner, user input button, or the like. These and other input devices may be connected to the CPU 730 through a serial port interface 742 coupled to system bus 728, but may be connected by other interfaces, such as a parallel port, game port or a universal serial bus (USB). A monitor 734 or other type of display device may also be connected to system bus 728 via an interface, such as a video adapter 732. In addition to the monitor 734, the computing system 700 may further include other peripheral output devices such as speakers and printers.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A radar system, comprising:
    a housing having a base configured to be mounted on a marine vessel;
    a radar disposed inside the housing;
    an antenna coupled to the radar;
    a lighting system having a light source and a light pipe configured to distribute light generated by the light source at one or more predetermined beam angles with respect to the radar system, wherein at least a portion of the lighting system is disposed inside the housing; and
    a controller coupled to the lighting system.

2. The radar system of claim 1, wherein the light source comprises at least one light emitting diode mounted to a circuit board.

3. The radar system of claim 1, wherein the lighting system comprises an optical filter coupled to the light source, and wherein the optical filter is configured to produce two or more separate light beams emanating from the radar system.

4. The radar system of claim 1, wherein the housing comprises an aperture through which light from the light source is emitted.

5. The radar system of claim 4, wherein the lighting system comprises an optical filter, and wherein the optical filter is configured to produce light emitted from the aperture at a predetermined intensity.

6. The radar system of claim 1, wherein the lighting system is configured to direct at least one light beam at a downward angle in respect to a horizontal axis substantially parallel to the waterline of the marine vessel.

7. The radar system of claim 1, further comprising a communication interface configured to communicate with a marine electronics device.

8. The radar system of claim 1, wherein the controller comprises a processor and a memory, and wherein the memory comprises program instructions executable by the processor and configured to:
receive one or more lighting control commands from a marine electronics device, wherein the lighting control commands are configured to change one or more settings of the lighting system, wherein the settings comprise at least one of the following:
a predetermined beam angle of light emitted by the lighting system;
a number of light beams emitted by the lighting system;
an intensity level of light emitted by the lighting system;
a specific color of light emitted by the lighting system; or
a combination thereof; and
adjust the lighting system to correspond to the lighting control commands in response to receiving the lighting control commands.

9. The radar system of claim 1, further comprising a power supply configured to power the radar and the light source.

10. The radar system of claim 1, wherein the lighting system further comprises a second light source configured to emit light that signifies a port side of the marine vessel and wherein the light source is a first light source that is configured to emit light that signifies a starboard side of the marine vessel.

11. A non-transitory computer-readable medium having stored thereon a plurality of computer-executable instructions which, when executed by a computer, cause the computer to:
receive, at a radar system, one or more radar control commands from a marine electronics device, wherein the one or more radar control commands are configured to adjust one or more operation conditions of a radar in the radar system;
receive, at the radar system, one or more lighting control commands from the marine electronics device, wherein the lighting control commands are configured to change one or more settings of a lighting system in the radar system, wherein the settings comprise at least one of the following:
a predetermined beam angle of light emitted by the lighting system;
a number of light beams emitted by the lighting system;
an intensity level of light emitted by the lighting system;
a specific color of light emitted by the lighting system; or
a combination thereof;
adjust the radar to correspond to the radar control commands; and
adjust the lighting system to correspond to the lighting control commands.

12. The non-transitory computer-readable medium of claim 11, wherein the computer-executable instructions to adjust the lighting system further comprise computer-executable instructions to cause the computer to adjust an amount of electric power going to at least one light source in the lighting system.

13. The non-transitory computer-readable medium of claim 11, wherein the lighting control commands comprise at least one command configured to turn off at least one light source in the lighting system.

14. The non-transitory computer-readable medium of claim 11, wherein the lighting control commands comprise at least one command configured to adjust the intensity of light emanating from at least one light aperture in the lighting system.

15. A non-transitory computer-readable medium having stored thereon a plurality of computer-executable instructions which, when executed by a computer, cause the computer to:
receive, at a marine electronics device of a vessel, a first input that indicates one or more radar control commands, wherein the one or more radar control commands are configured to adjust one or more operation conditions of a radar in a radar system;
receive, at the marine electronics device of the vessel, a second input that indicates one or more lighting control commands for a lighting system of the radar system of the vessel wherein the lighting control commands are configured to change one or more settings of the lighting system, wherein the settings comprise at least one of the following:
a predetermined beam angle of light emitted by the lighting system;
a number of light beams emitted by the lighting system;
an intensity level of light emitted by the lighting system;
a specific color of light emitted by the lighting system; or
a combination thereof;
send the one or more radar control commands to the radar system to cause adjustment of one or more operation conditions of the radar based on the received first input; and
send the one or more lighting control commands to the radar system to cause adjustment of the one or more settings of the lighting system based on the received second input.

16. The non-transitory computer-readable medium of claim 15, wherein the commands are configured to cause the radar system to stop electric power to at least one light source in the lighting system.

17. The non-transitory computer-readable medium of claim 15, wherein the commands are configured to cause the radar system to send power to at least one light source in the lighting system.

18. The non-transitory computer-readable medium of claim 15, wherein the computer-executable instructions further cause the computer to display the settings of the lighting system.

19. The non-transitory computer-readable medium of claim 15, wherein the settings comprise at least one of the following:
a predetermined beam angle of light emitted by the lighting system;
a number of light beams emitted by the lighting system;
an intensity level of light emitted by the lighting system;
a specific color of light emitted by the lighting system; or
a combination thereof.

20. A radar system, comprising:
a housing having a base configured to be mounted on a marine vessel;
a radar disposed inside the housing;
an antenna coupled to the radar;
a lighting system having a light source and an optical filter coupled to the light source, wherein the optical filter is configured to produce two or more separate light beams emanating from the radar system, wherein at least a portion of the lighting system is disposed inside the housing; and a controller coupled to the lighting system.

21. A radar system, comprising:
a housing having a base configured to be mounted on a marine vessel;
a radar disposed inside the housing;
an antenna coupled to the radar;
a lighting system having a light source and a second light source, wherein the first light source is configured to emit light defining a first color that signifies a starboard side of the marine vessel, wherein the second light source is configured to emit light defining a second color that signifies a port side of the marine vessel, wherein at least a portion of the lighting system is disposed inside the housing; and
a controller coupled to the lighting system.

* * * * *